Patented Mar. 29, 1932

1,851,393

UNITED STATES PATENT OFFICE

HEINRICH LIER, OF BASEL, SWITZERLAND, ASSIGNOR TO FIRM OF CHEMICAL WORKS FORMERLY SANDOZ, OF BASEL, SWITZERLAND

PREPARATION OF WETTING AGENTS FOR USE IN MERCERIZING LYES

No Drawing. Application filed August 7, 1930, Serial No. 473,773, and in Germany June 14, 1930.

I have found that very valuable wetting-out preparations which possess a great efficacy when being used in strong alkaline solutions like mercerizing lyes can be prepared by mixing phenols, like phenol, cresols, xylenols, p-chlorphenol, p-chlor-m-cresol or mixtures thereof with saturated or unsaturated polyhydric alcohols of the aliphatic, araliphatic or alicyclic series, containing at least one carbon atom more than hydroxylic groups. Such compounds are for instance the glycols obtained by the oxidation of the olefinehydrocarbons, the pinacones obtained by the reduction of the ketones and the polyhydric aliphatic or aliphatic-aromatic alcohols which may be prepared by treating with an excess of organomagnesium salts the polycarboxylic acids, polyketones, polyaldehydes, ketone- and aldehyde carboxylic acids, polycarbonyl compounds, hydroxycarboxylic acids and hydroxycarbonyl compounds.

When added to alkaline lyes, these mixtures impart to them very durable wetting-out properties, which are not affected by the temperatures generally used in mercerizing processes. In order to obtain the desired effect, the above described mixtures are added in suitable quantities to the alkaline lyes of various concentrations or the mixtures are generated therein by adding their constituents under good stirring.

According to the present invention it is possible to mercerize dry raw sized cotton fibres very rapidly and to obtain a very high lustre in a single treatment.

The following examples, without being limitative, illustrate the new process, the parts being by weight:

Example 1

To 100 parts of a caustic soda solution of 30° Bé. are added 1.2 per cent of a mixture consisting of 85 per cent of a technical cresol mixture and 15 per cent of tetramethylethylene glycol (pinacone). The wetting-out action of the clear solution thus obtained is so great that raw dry cotton tissues and yarns are immediately impregnated and shrink very rapidly. Tissues and felts composed of animal fibres are also immediately and uniformly impregnated with this solution. Instead of pinacone, pinaconehydrate can be used.

Example 2

To 100 parts of a caustic soda solution of 32° Bé. are added 1.56 per cent of a mixture consisting of 94 per cent of technical cresol mixture and of 6 per cent of tetraethylhexan-1-6-diol of the formula

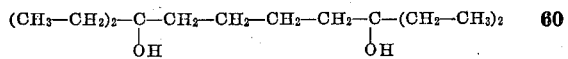

(obtained from adipinic acid ester and ethyl magnesium bromide). The solution thus obtained possesses very strong wetting-out properties and impregnates immediately tissues composed of cellulosic or animal fibres.

Example 3

To 100 parts of a caustic soda solution of 35° Bé. are added 1.14 per cent of a mixture consisting of 95 per cent of technical xylenol mixture and of 5 per cent of a mixture of methylcyclohexandiols of the formula

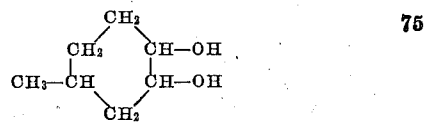

prepared by oxidation of the technical tetrahydrotoluol with potassium permanganate. The thus obtained clear solution possesses a very great wetting power of an excellent stability for raw sized cotton material.

Example 4

To 100 parts of a caustic soda solution of 32° Bé. at 15° C. are added 1.1 per cent of a mixture consisting of 80 per cent of p-chlorphenol and 20 per cent of a methylcyclohexandiol mixture. The thus obtained solution wets immediately raw sized cotton fabrics.

What I claim is:

1. A process for the preparation of wetting agents for use in mercerizing lyes, consisting in mixing phenols with such polyhydric alcohols which contain at least one carbon atom more than hydroxylic groups.

2. A process for the preparation of wetting agents for use in mercerizing lyes, consisting in mixing phenols with such aliphatic polyhydric alcohols which contain at least one carbon atom more than hydroxylic groups.

3. A wetting agent for use in mercerizing lyes, comprising phenols and such polyhydric alcohols which contain at least one carbon atom more than hydroxylic groups.

4. A wetting agent for use in mercerizing lyes, comprising phenols and aliphatic polyhydric alcohols which contain at least one carbon atom more than hydroxylic groups.

5. A process for alkalizing cellulosic fibres, consisting in submitting them to the action of mercerizing lyes containing phenols and such polyhydric alcohols which contain at least one carbon atom more than hydroxylic groups.

6. Mercerizing lyes of high wetting-out action, containing phenols and such polyhydric alcohols which contain at least one carbon atom more than hydroxylic groups.

In witness whereof I have hereunto signed my name this 23rd day of July, 1930.

HEINRICH LIER.